United States Patent [19]
Rehder

[11] 3,818,822

[45] June 25, 1974

[54] SEED ABRADING DEVICE

[76] Inventor: Max C. Rehder, 510-7 Ave. S., Moorhead, Minn. 56560

[22] Filed: June 15, 1972

[21] Appl. No.: 263,234

[52] U.S. Cl. .................................. 99/600, 241/7
[51] Int. Cl. ....................... B02b 3/00, A01c 1/00
[58] Field of Search ............ 99/469, 471, 472, 484, 99/516, 519, 613, 623, 600, 601, 602, 611, 609, 614, 615, 584; 241/6–8; 19/6

[56] References Cited
UNITED STATES PATENTS

| | | | |
|---|---|---|---|
| 201,767 | 3/1878 | Forman | 99/471 X |
| 728,859 | 5/1903 | Caldwell | 99/471 |
| 810,960 | 1/1906 | Miller | 99/471 X |
| 888,678 | 5/1908 | Wilson | 99/613 X |
| 989,421 | 4/1911 | Reinhardt | 99/613 |
| 1,890,642 | 12/1932 | Edwards | 99/469 X |
| 2,098,521 | 11/1937 | Seymour | 99/613 X |
| 3,397,067 | 8/1968 | Galle | 99/471 X |

FOREIGN PATENTS OR APPLICATIONS

| | | | |
|---|---|---|---|
| 6,589 | 1/1893 | Germany | 99/613 |

Primary Examiner—Leon G. Machlin
Attorney, Agent, or Firm—Leo Gregory

[57] ABSTRACT

A seed abrading apparatus formed as a chute comprising a pair of closely spaced vertically disposed angularly stepped walls, said walls having facing abrading surfaces, suction means in connection with said chute drawing a turbulented air stream downwardly therethrough impacting said seeds in a tumbling action against said abrading surfaces and a discharge means at the foot of said chute.

1 Claim, 4 Drawing Figures

PATENTED JUN 25 1974 3,818,822

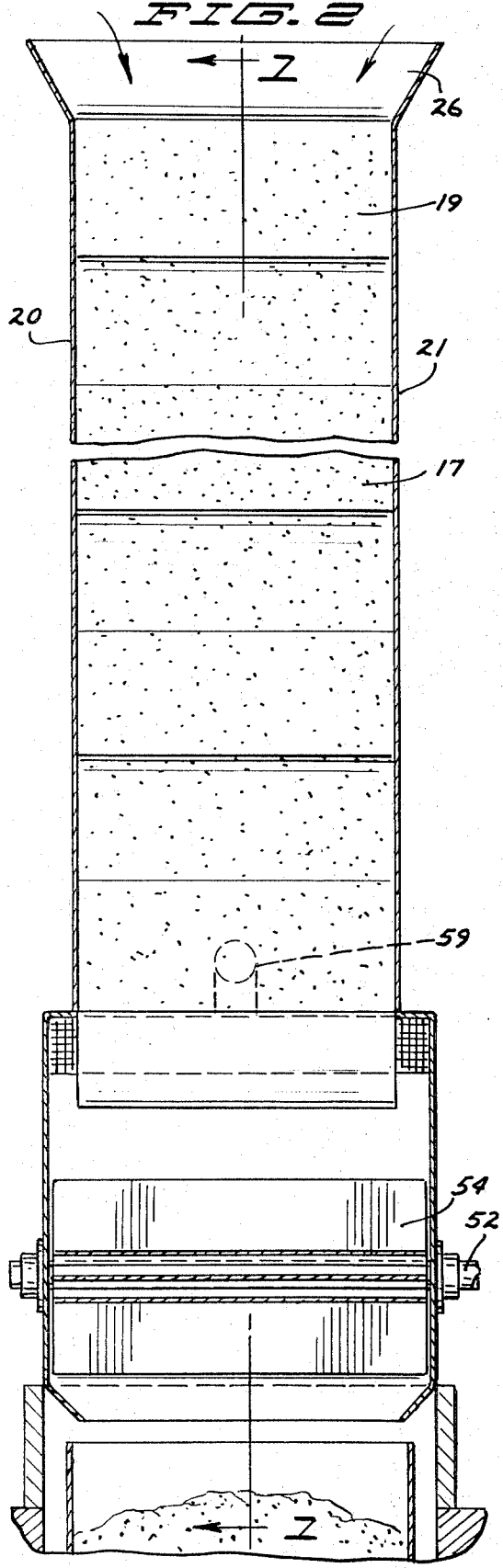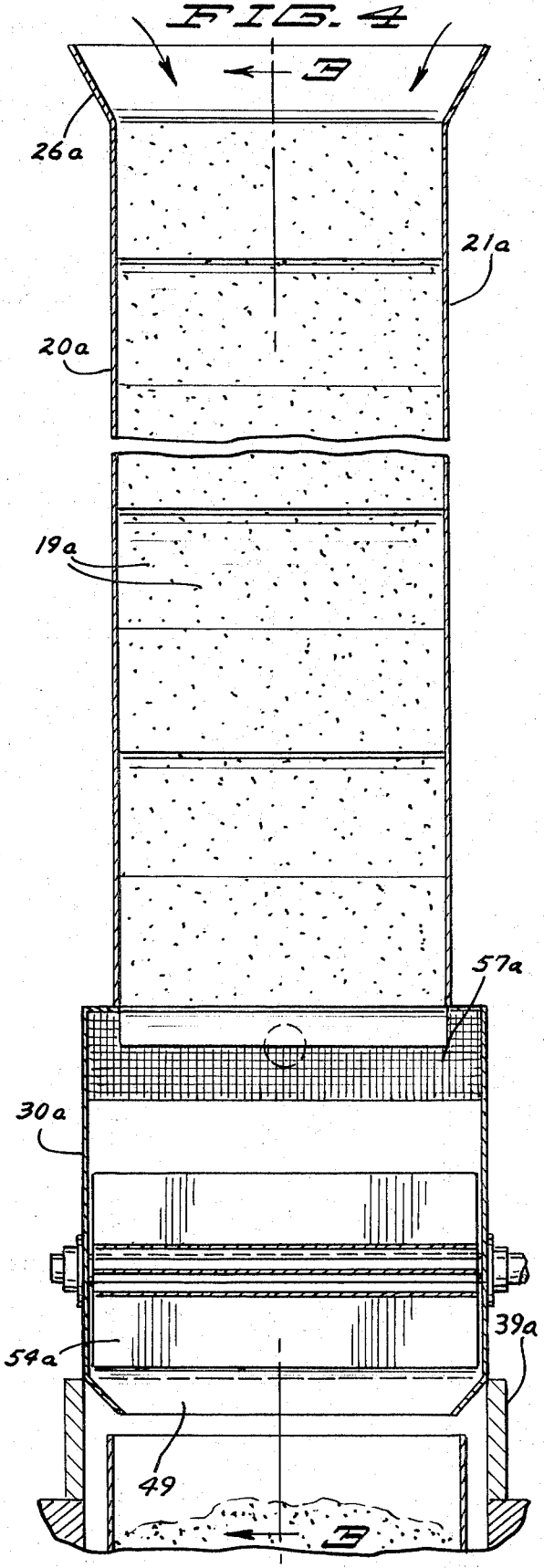

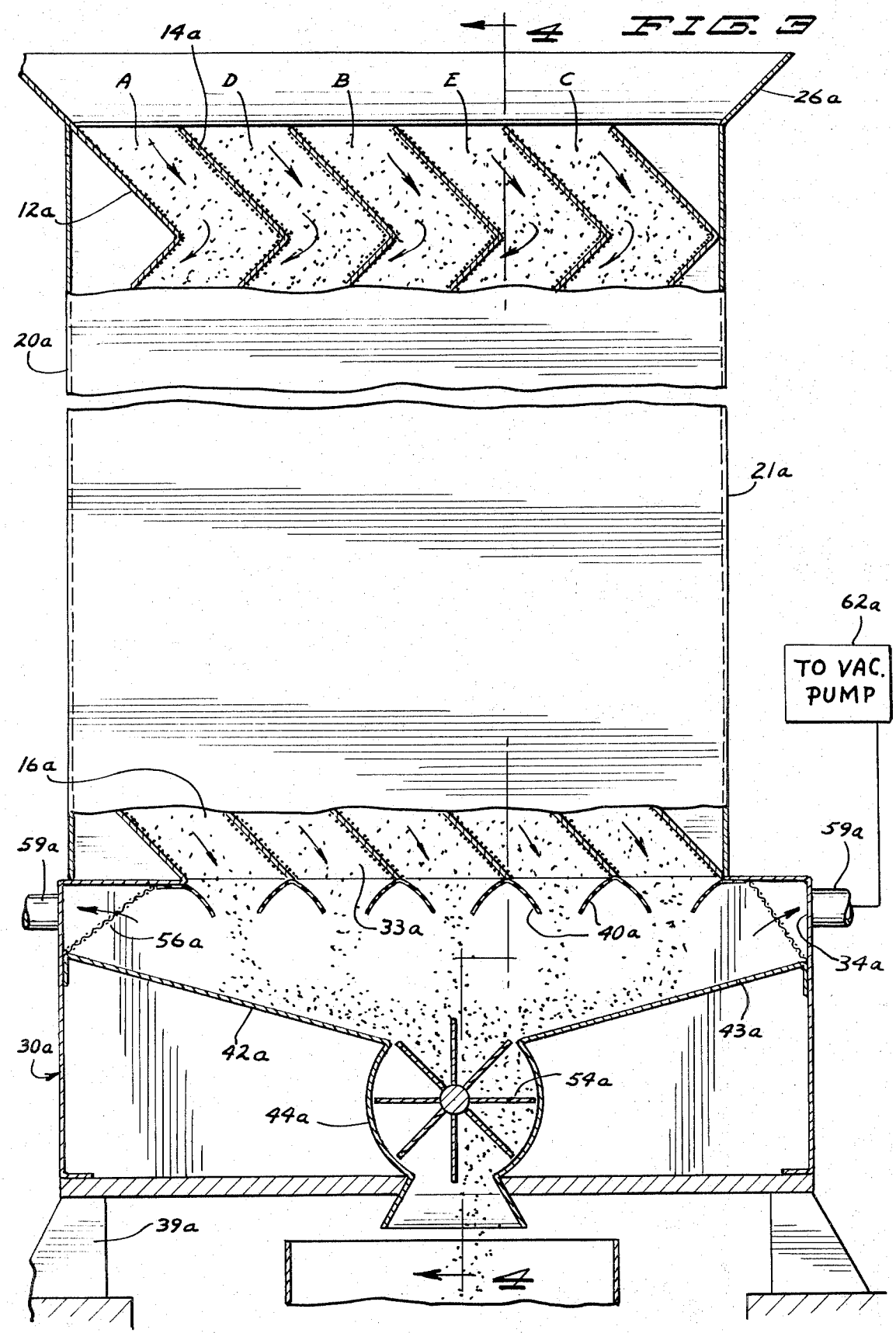

SEED ABRADING DEVICE

SUMMARY AND BACKGROUND OF THE INVENTION

This invention relates to an efficient and simply constructed apparatus to abrade seeds for the removal of sufficient of the outer covering thereof together with irregularities therein to form uniformly shaped and sized seeds.

Although seeds are available in size categories, the seeds themselves are not uniformly formed being more generally irregularly shaped having planes, corners and projections, all of which makes it difficult for the seeds to pass through a seeding device comprising a rotating plate member having uniform holes therein particularly adapted to pass a uniformly shaped seed of a given size. The seeds which do not pass through the plate but become lodged therein are damaged. This represents a substantial loss in a seeding operation.

Preliminary treatment of the seeds to reduce the seeds to a given uniformity and a given size is desirable for a more efficient and complete distribution of seed with respect to planting devices.

Representative structures in related art are indicated by the U.S. letters Pat. No. 2,166,652 — 1939 to Zinsser, U.S. Pat. No. 2,667,197 — 1954 to Giles and U.S. Pat. No. 2,572,262 — 1957 to Hibbard. Zinsser uses angled abrasive coated discs mounted on a shaft to engage the seeds in a tumbling action to husk the same. Giles uses an upward air stream to blow seeds against a hard unyielding surface particularly for removing hulls from kernals of grain. Hibbard tumbles pieces of vegetables and fruits upon abrasive drums within cooperating abrasive coated sleeves to form ball shaped pieces. The structure disclosed in the above patents are substantial and complex structures in comparison to what is disclosed herein.

It is an object of this invention therefore to provide a relatively inexpensive and simply constructed abrading apparatus for the purpose of making seeds uniform in shape and size.

It is another object of the invention herein to provide a chute like structure wherein seeds are air borne therethrough in a tumbling turbulent action against abrading surfaces to reduce the seeds to uniformity both as to shape and size.

More generally stated, it is an object of this invention to provide a chute structure having vertically disposed closely spaced walls which are angularly stepped and which have facing abrading surfaces and suction means at the foot of said chute to cause a turbulented air stream to be drawn through said chute to carry seeds therewith and impact the same against said brading surfaces and a controlling means to discharge said seeds onto a conveying means.

These and other objects and advantages of the invention will be set forth in the following description made in connection with the accompanying drawings in which like reference characters refer to similar parts throughout the several views and in which:

FIG. 2 is a view in vertical section taken on line 2—2 of FIG. 1 as indicated;

FIG. 3 is a modification of the structure herein in vertical section taken on line 3—3 of FIG. 4 as indicated, and FIG. 4 is a view in vertical section taken on line 4—4 of FIG. 3 as indicated.

DESCRIPTION OF A PREFERRED EMBODIMENT

Figure 1:
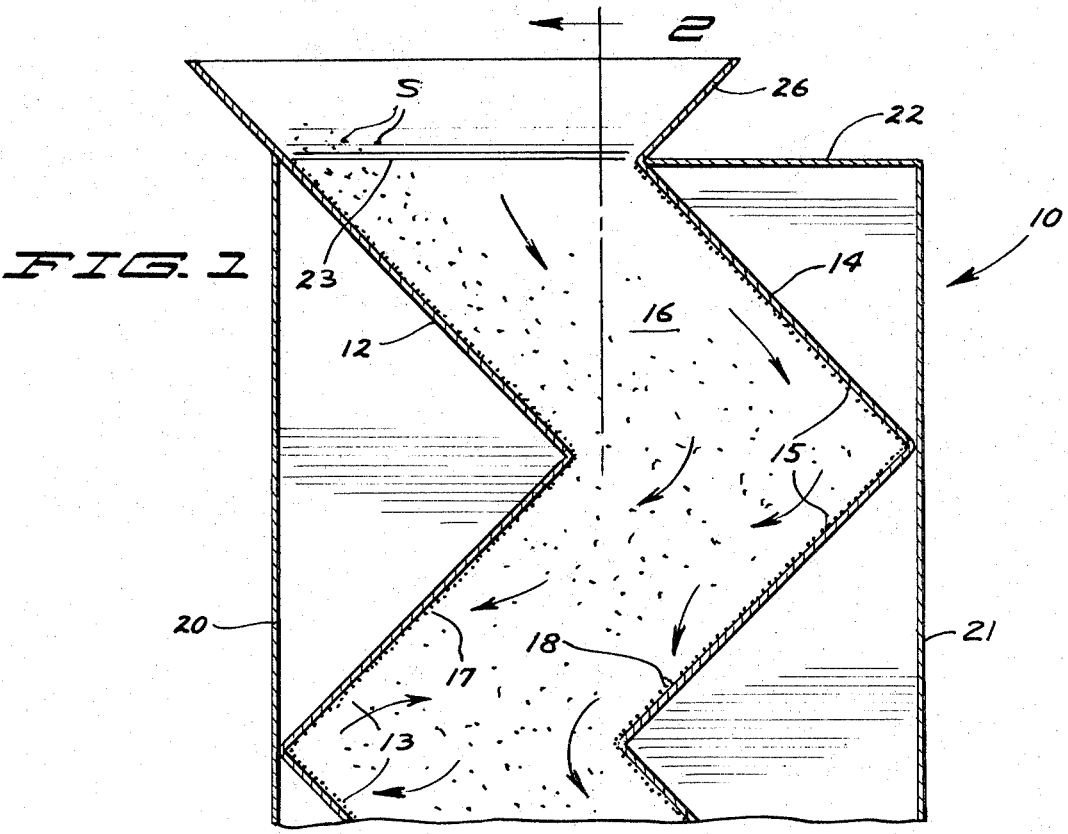
FIG. 1 is a view in vertical section taken on line 1—1 of FIG. 2 as indicated.
Figure 1:
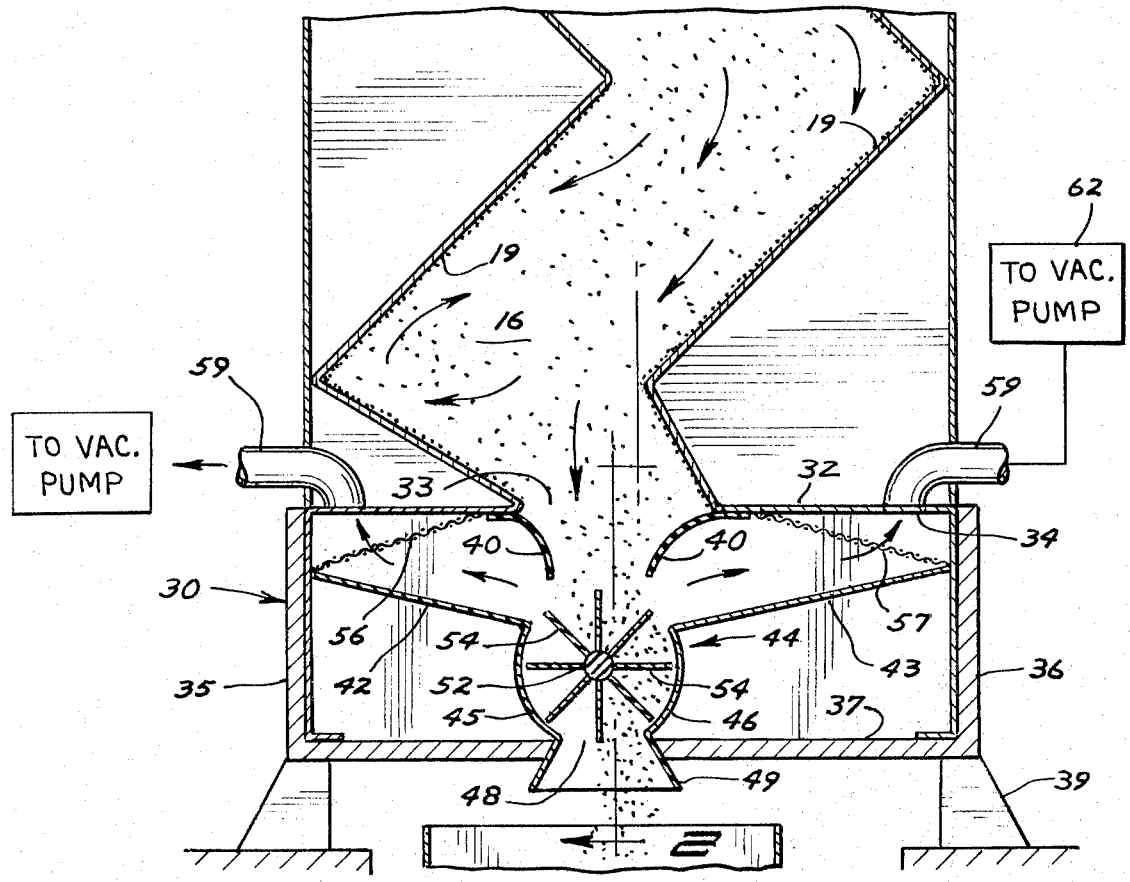

Referring to the drawings, the structure comprising the invention herein is indicated generally by the reference numeral 10.

Said structure comprises a pair of closely spaced facing vertically disposed angularly stepped plate members 12 and 14 each having a plurality of preferably right angled step portions 13 and 15 and having their respective step portions preferably in parallel relationship with one another forming an angled passage 16 therebetween. The facing surface portions 17 and 18 of said plate members have an abrasive coating or surface 19 which may be formed in many conventional ways such as by the overlay of a sheet of material thus coated.

Although said plate members are indicated as having their facing surfaces overlaid with abrasive coated sheet material, it will be understood that such sheet material is available having sufficient substance and rigidity to self form said plate members.

Holding said plate members 12 and 14 in spaced relation in a conventional manner are side walls 20 and 21.

Said side walls have a top wall 22 extending therebetween having an opening 23 therein into said passage 16 and having extending upwardly therefrom an outwardly flared inlet structure 26 forming a hopper.

Supporting said side walls and said plate members is a base supporting structure 30 forming an enclosure parallelepiped in form having a top wall 32, end walls 35 and 36 and a bottom wall 37 supported by legs 39. Said top wall has an opening 33 therein as an outlet for said passage 16 and restricting said opening are a pair of closely spaced yielding flap members 40 suitably secured to opposed edge portions of said opening 33.

Said enclosure includes inclined inner wall portions 42 and 43 extending from the walls 35 and 36 and having secured between their adjacent ends a paddle wheel housing 44 comprising arcuate side wall portions 45 and 46 which are spaced apart at their upper portions where they are engaged respectively by said wall portions 42 and 43 and which are spaced apart at their lower end portions which rest upon the bottom wall 37 with an opening 48 in said bottom forming a discharge outlet and extending therethrough and depending therefrom are oppositely inclined plate portions forming a stub discharge chute 49.

Disposed within said housing 44 and carried on a shaft 52 suitably journaled within said enclosure 30 is a paddle wheel type of conveyor 54 having paddles in sufficient number to have said housing 45 sealed at all times. Said housing and said paddle wheel conveyor will extend across the width of said enclosure. Said paddle wheel conveyor will have its shaft conventionally driven by means not here shown.

Extending from either side of said opening 33 to said walls 35 and 36 for engagement therewith adjacent the ends of said wall portions 42 and 43 are screens 56 and 57.

Said top wall 32 will have a plurality of openings 34 therein and running thereto will be hoses 59 which will run as from a common line to a suitable suction or vacuum source or pump 62 as here schematically indicated. Means adjusting the size of said openings such as sliding plates may be included but such controls are conventional and are not here shown.

Although there is no requirement for specific dimensions, it is desirable that the plate members 12 and 14 be relatively close together to provide for an effective turbulent air stream moving through the passage 16.

A successfully operated model of the device herein was made having a height of some 5 feet, a width of some 8 inches and having a spacing between parallel step portions of said plate members on the order of 2½ inches.

OPERATION

Seeds S are gravity fed through the device herein. Prior to passing seeds through the passage 16, the suction pump will be started to draw air through said passage 16. Preferably a variable suction pump will be used and the degree of suction applied and the degree to which air will be turbulented in said passage will be determined by the size and weight of the seeds fed into said passage. This all comes within the skill and judgment of the operator. With the suction pump in operation, the paddle conveyor will be rotated and then seeds, such as sugar beet seeds, will be fed through the hopper 26 into the passage 16.

The seeds will be caught up in the air stream drawn through said passage 16 and the turbulented air will cause said seeds to have a tumbling action and will carry and deliver them with an effective impact against the abrasive facing step portions. The angled steps diverge the air stream drawn through the passage 16 from a straight course therethrough thus causing it to become turbulent in being deflected from the angled surface portions engaged and causing substantial whirling action of the air throughout the extent of the passage.

Thus the seeds are carried by said turbulented air in a tumbling action and effectively engage with considerable impact the abrasive stepped surfaces of said plate members 12 and 14.

The suction is applied to the openings 59 and the air is drawn into and through the passage 16 through the restricted bottom opening 33.

The seeds pass through the flap members 40 into the paddle wheel housing 44 and are moved outwardly therethrough to be discharged through the chute 49. Said seeds by means not here shown will be conveyed to a grader and separator and such seeds as require further treatment will be recycled through the abrading device until they become sufficiently uniform and of such size as desired for seeding. The device herein does not cause such a cracking or wearing away of the hulls of the seeds as to damage the seed but it does efficiently abrade the seeds to achieve the desired end result. The seeds may require recycling until they are reduced to a desired uniformity of shape and size. Thus, harsh and damaging treatment of the seeds is avoided.

The specific grit size or grit characteristic of the abrasive sheet material is dependent upon the kinds of seeds being treated and the abrading is not so severe as to be damaging to the seeds.

MODIFICATION

With reference to FIGS. 3 and 4 a modification of the structure above described is shown consisting of a plurality of units of said structure arranged in a unitary structure. All of the parts are as above described and are indicated by like reference numerals with the character "a" added. The hopper 26, the side walls 20 and 21 and the base enclosure 30 are merely extended in length.

With the individual units or chutes A, B and C each being regarded as identical to the structure above described, it will be noted that like chutes D and E are formed between the facing stepped plates of A-B and B-C. Hence chutes A-E are of identical structure. Thus the combining of each pair of chutes in a unitary structure results in a third chute being formed therebetween.

No further details of description are believed necessary and the operation is as above described.

A prototype of the device herein has been tested and it proved to be very efficient and effective in reducing seeds to a desired uniformity in shape and in size and thus resulting in a more complete and uniform distribution of seed from a planting device. A great savings in seed cost is made possible by the efficient distribution of seeds from the planter resulting from the use of seeds having uniformity in shape and size.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A seed abrading device having in combination
   a pair of spaced vertically disposed angularly stepped plate members having facing surfaces forming a chute therebetween,
   said plate members having abrasively coated facing surfaces,
   a chamber to receive seed underlying said plate members,
   means drawing a vacuum on said chamber,
   a discharge chute in connection with said chamber,
   a paddle wheel discharge member disposed in said discharge chute sealing said discharge chute against the entrance of air into said chamber therethrough, and
   a pair of resilient flap members in opposed relation secured at their remote ends to the bottom of said chute formed by said plate members and having their adjacent end portions yielding to the effect of the vacuum drawn on said chamber to pass seed therebetween.

* * * * *